United States Patent Office 3,848,041
Patented Nov. 12, 1974

3,848,041
COLOR STABILIZATION OF ARTICLES FABRICATED FROM NITRILE POLYMERS
Domas Adomaitis, Chicago, Ill., assignor to Continental Can Company, Inc., New York, N.Y.
No Drawing. Filed June 22, 1972, Ser. No. 265,373
Int. Cl. B29c 17/07; B29f 3/03; C08f 45/00
U.S. Cl. 264—98
14 Claims

ABSTRACT OF THE DISCLOSURE

A method for inhibiting color change in articles fabricated from thermoplastic nitrile polymers wherein the moisture content of the polymer is controlled between about 0.2 to 0.6% by weight when the polymer is molded to form the article.

BACKGROUND OF THE INVENTION

1. Field of the Invention

This invention relates to articles fabricated from nitrile polymers and more particularly to a method for stabilizing the nitrile polymer article to color change.

2. Prior Art

Thermoplastic materials have already been used for manufacturing containers and in particular bottles. The thermoplastic compositions from which the bottles are fabricated are suitable for use from the standpoint of product potability and general mechanical requirements.

A class of polymers that is finding increasing application for plastic bottle fabrication is thermoplastic polymers having a high nitrile monomer content in the order of 60% or more, such as the copolymers of olefinically unsaturated nitriles such as acrylonitrile, methacrylonitrile and ethylenically unsaturated comonomers such as alkyl acrylates, styrene and graft copolymers of the nitrile copolymers with diene rubbers.

Nitrile polymers exhibit high clarity, transparency and water white or lightly tinted color. Often, the nitrile polymer yellows or otherwise changes color upon when fabricated into bottles. Color change of the polymer is unacceptable for packaging containers since the container fabricated from the discolored polymer does not provide the consumer with a true view of the contents of the container and in general, presents an unesthetic appearance. The incorporation of color stabilizing adjuvants in the nitrile polymer resin used for the fabrication of the container is undesirable as many of the known stabilizers are toxic and hence not useable for food containers.

It has been unexpectedly discovered that when the moisture content of nitrile polymer resins is regulated to between about 0.2 to about 0.6% by weight of the polymer, discoloration of the polymer is substantially inhibited, and articles free of undesirable color changes can be consistently fabricated from the polymer.

Although it is known to the art e.g., U.S. 2,578,700 to extrude moistened thermoplastic resins to prepare decorative plastic articles, it is the standard practice in the plastic container art to dry the resin to a moisture content of 0.1% or less before fabrication is attempted in order that the container fabricated from the resin be free of such defects as bubbles, pin-holes and other surface defects.

SUMMARY OF THE INVENTION

Color changes in articles fabricated from polymers having a nitrile monomer content of at least 60% by weight is substantially reduced during molding by the process of the present invention wherein the moisture content of the nitrile polymer is controlled to between 0.2 and 0.6% by weight of the polymer and the moistened polymer is then molded or otherwise fabricated into the desired article.

The substantial inhibition of color change in containers fabricated from nitrile polymers resulting from the practice of the present invention enables the container manufacturer to consistently meet color specifications set for the containers and thereby reduces the rejection rate of the containers as well as to permit the salvaging of scrap resin for reprocessing.

PREFERRED EMBODIMENTS

The class of nitrile polymers from which the containers of the present invention may be fabricated include those polymers prepared by polymerizing a major portion of an olefinically unsaturated nitrile and a minor portion of at least one other olefinically unsaturated monomer copolymerizable with the nitrile.

The olefinically unsaturated nitriles used to prepare the nitrile polymer are the alpha, beta-olefinically unsaturated mononitriles having the structure

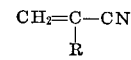

wherein R is hydrogen, a lower alkyl group having 1–4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles used in preparing the nitrile polymer are acrylonitrile and methacrylonitrile and mixtures thereof.

Exemplary monomers which can be copolymerized with the nitrile monomer include one or more unsaturated monomers such as the acrylate esters including methyl acrylate, ethyl acrylate, the propyl acrylates, the butyl acrylates, the amyl acrylates, the hexyl acrylates, cyclohexyl acrylate, phenyl acrylate, the methacrylate esters such as methyl methacrylate, the butyl methacrylates, the amyl methacrylates, the hexyl methacrylates, cyclohexyl methacrylate, vinyl esters such as vinyl acetate, vinyl propionate, vinyl butyrate, lower alpha olefins of from 2 to 8 carbon atoms, e.g., ethylene, propylene, isobutylene, butene-1, pentene-1, and their halogen and aliphatic substituted derivatives as represented by vinyl chloride, vinylidene chloride, etc.; monovinylidene aromatic hydrocarbon monomers such as styrene, alpha methyl styrene, vinyl toluene, alpha chlorostyrene, ortho chlorostyrene, para chlorostyrene, meta chlorostyrene, ortho methyl styrene, para methyl styrene, ethyl styrene, isopropyl styrene, dichloro styrene and vinyl naphthalene.

Another group of comonomers suitable for use in the practice of this invention are vinyl ethers including vinyl methyl ether, vinyl ethyl ether, vinyl n-butyl ether, vinyl 2-chloroethyl ether, vinyl phenyl ether, vinyl isobutyl, ether, vinyl cyclohexyl ether, p-butyl cyclohexyl ether, vinyl ether and p-chlorophenyl glycol.

The nitrile polymers of the present invention are generally copolymers which contain about 60 to about 99 percent by weight of the nitrile monomer and about 1 to about 40 percent by weight of one or more other unsaturated monomers.

It is to be clearly understood that the process of the present invention can be utilized and is effective with any polymer having as its major constituent a nitrile monomer as hereinbefore defined. Thus, the color stabilization process of the present invention is equally effective in the treatment of thermoplastic nitrile resins which include in the composition a synthetic or natural rubber component such as polybutadiene, isoprene, neoprene, nitrile rubbers, acrylonitrile-butadiene copolymers, ethylenepropylene copolymers and chlorinated rubbers. This rubbery component may be incorporated into the nitrile containing polymer at a concentration of up to 25 percent by weight and preferably about 1 to about 20 percent by weight by any of the methods which are well known to those skilled in the art, e.g., direct polymerization of monomers, polyblends, grafting the nitrile monomer mixture onto the rubber backbone and physical admixture of the rubbery component. Especially preferred are graft copolymers of a nitrile monomer and a second comonomer on a rubbery backbone of the type disclosed in U.S. 3,426,-102 and 3,615,710 which are comprised of about 70 to 99 percent by weight of an olefinic nitrile/alkyl acrylate or monovinylidene aromatic hydrocarbon copolymer containing at least 60% by weight of the olefinic nitrile graft polymerized with 1 to 20 percent by weight of a diene-nitrile rubber. Thus the term "nitrile polymer" as used herein includes blends with rubber, graft copolymers with rubber as well as unblended and ungrafted nitrile copolymers.

The addition of moisture to the nitrile polymer resin is accomplished by the use of water vapor, steam or water. For best results, the nitrile polymer undergoes humidification in an enclosed area so that the resin is fully exposed to the aqueous environment. In one embodiment of the invention the nitrile polymer resin is humidified until the moisture content of the polymer is between 0.2 to 0.6 percent by weight. The humidification time sufficient to incorporate this moisture content in the polymer is generally between 10 to 20 hours.

It is essential and critical to the practice of the present invention that the moisture content of the nitrile polymer resin during molding of an article therefrom have a water content no more than about 0.6% by weight. If the water content of the polymer is allowed to substantially exceed 0.6%, the containers fabricated therefrom will have bubbles, pinholes and other surface defects that will render them unacceptable for their intended use.

Although it is essential to the practice of the present invention that the nitrile polymer to be molded into an article have a water content of no more than about 0.6% by weight, it is not essential that the polymer initially submitted to the article fabrication process have a moisture content of less than 0.6% by weight and in fact in a second embodiment of the invention the water content of the nitrile polymer can be substantially in excess of 0.6% by weight so long as the moisture content of the polymer during the molding step of the article fabrication process does not exceed 0.6% by weight.

For example, it is well known to the art to fabricate hollow containers from thermoplastic resins by a process referred to in the art as "blow molding." In this process, a thermoplastic resin is fed to an extrusion zone whereby the resin is melted, plasticized and then extruded in the form of a tubular, expansible parison which is received within a molding zone comprised of a multisection mold having the configuration of the desired container wherein the parison is expanded by internal air or other fluid pressure means to form the container. Blow molding temperatures for nitrile polymer generally vary from 350° to 470° C.

It is within the purview of the present invention that in the blow molding of containers from nitrile polymer fed to the extrusion zone wherein the parison is initially formed, the nitrile polymer have a water content substantially in excess of 0.6% weight, but that the water content of the nitrile polymer be lowered to a value of less than 0.6% by weight in the extrusion zone and before the discharge of the polymer from the extrusion zone in the form of a parison.

One means of lowering the moisture content of the nitrile polymer in the extrusion zone is to provide the extrusion zone with a water removal means such as a steam venting means, which means are known to the art and need not be further elaborated herein. Where the extrusion zone in a blow molding process is provided with a means for removal of water from the nitrile polymer at a position in the zone prior to the point at which the nitrile polymer is discharge from the extrusion zone, the water content of the nitrile polymer initially fed to the zone can be any amount in excess of 0.6% as for example, 1 to 3% by weight.

The following examples are set forth for the purpose of illustration and are not to be construed as limiting on the present invention except as set forth in the claims. All percentages are by weight unless otherwise specified.

EXAMPLE I

Resin ground from clear blue plastic bottles fabricated from Lopac, a commercially available thermoplastic nitrile polymer consisting primarily of a methacrylonitrile/styrene copolymer containing about 70–98% methacrylonitrile, and the remainder styrene was dried in a vacuum oven at 60° C. The resin was soaked in a water bath at 78° C. for 17 hours and then milled for 5 minutes. The milled resin was found to contain 0.4% water.

Bottles having a weight of 40 grams, a wall thickness of 35 mils and a volume of 10 ounces were extrusion blow molded from the humidified resin.

The bottles so formed were found to have a clean, blue color, characteristic of the original bottle resin.

A sample of the humidified resin was compresson molded to a 6 x 4 x 0.025 inch plaque which was inspected for color change using a "Color Eye" tri-stimulus colorimeter. This colorimeter measures the intensity of the transmitted light through three color filters namely, red (X), green (Y) and blue (Z). Using this instrument, tri-stimulus values are obtained which are a measure of color hue of the molded resin. In order to compare the colors of different molded resins, the Yellowness Index of the resins are calculated in accordance with ASTM D 1925–70. The higher the Yellowness Index value, the greater has been the color change of the resin due to the molding operation.

The Yellowness Index value for a bottle molded from the moistened resin of Example I as well the Yellowness Index value of a bottle purchased on the commercial market is recorded in Table I below.

For purposes of comparison, bottles were also molded from resin ground from commercial Lopac bottles which were dried in an oven at 140° F. for 24 hours in accordance with standard bottle molding practice. The resin was not moistened before molding into bottles. The moisture content of the dried resin was found to be 0.09%. The Yellowness Index value of this comparative bottle is also recorded in Table I.

TABLE I

| Sample No. | Sample | Yellowness index | Visual appearance of bottle |
|---|---|---|---|
| 1 | Commercial bottle | −1.8 | Clear blue. |
| 2 | Bottle molded from moistened polymer having 0.4% water content. | −3.6 | Do. |
| 3 | Bottle molded from dried polymer having 0.09% water content. | 21.9 | Brownish-green. |

By reference to Table I, it is immediately apparent that bottles molded in accordance with the present invention from nitrile polymer having a 0.4% water content undergo substantially no color change, whereas bottles molded from nitrile polymer not moistened in accordance with the present invention having a 0.09% water content undergo substantial color change.

EXAMPLE II

The procedure of Example I was repeated with the exception that resin obtained from grinding bottles originally fabricated from a nitrile polymer comprised of 80% by weight acrylonitrile and 20% by weight styrene grafted onto a styrene butadiene rubber was substituted for the Lopac resin. The Yellowness Index of bottles molded from the resin containing varying amounts of moisture are recorded in Table II below.

TABLE II

| Sample No. | Moisture content of polymer resin | Yellowness index of bottle |
|---|---|---|
| 4 | 0.503 | 15.7 |
| 5 | 0.196 | 28.2 |
| 6 | 0.163 | 25.7 |

By reference to Table II, it is immediately apparent that bottles blow molded from nitrile polymer resin having a moisture content in excess of 0.2% by weight undergo less color change than bottles molded from nitrile polymer resin containing less than 0.2% by weight moisture.

What is claimed is:

1. A method for inhibiting color change in hollow containers blow molded from a thermoplastic nitrile resin comprised of (1) 60 to 99 percent by weight of an alpha, beta-olefinically unsaturated mononitrile having the structure $$CH_2=C-CN$$
$$|$$
$$R$$

wherein R is selected from the group consisting of a lower alkyl group having 1 to 4 carbon atoms and a halogen and (2) 1 to 40 percent by weight of at least one other olefinically unsaturated monomer copolymerizable with the mononitrile, which method comprises humidifying the nitrile resin to a moisture content of between 0.2 to 0.6% by weight extruding the humidified resin to form a tubular expansible parison and then expanding the parison to form the hollow article.

2. The method of claim 1 wherein the mononitrile is methacrylonitrile.

3. The method of claim 1 wherein the mononitrile is acrylonitrile.

4. The method of claim 1 wherein the olefinically unsaturated monomer is styrene.

5. The method of claim 1 wherein the resin is a methacrylonitrile/styrene copolymer.

6. The method of claim 1 wherein the resin is a copolymer of acrylonitrile and styrene grafted on to a styrene-butadiene rubber.

7. The method of claim 1 wherein the article is a bottle.

8. A method for inhibiting color change in hollow articles blow molded from a thermoplastic nitrile resin comprised of (1) 60 to 99 percent by weight of an alpha, beta-olefinically unsaturated mononitrile having the structure $$CH_2=C-CN$$
$$|$$
$$R$$

wherein R is selected from the group consisting of a lower alkyl group having 1 to 4 carbon atoms and a halogen and (2) 1 to 40 percent by weight of at least one other olefinically unsaturated monomer copolymerizable with the mononitrile, which method comprises humidifying the nitrile resin to a moisture content greater than 0.6% by weight, feeding the humidified resin to an extrusion zone, effecting removal of moisture from the nitrile polymer in the extrusion zone to reduce the moisture content of the polymer to between 0.2 to 0.6% by weight and then discharging the nitrile polymer from the extrusion zone in the form of a tubular, expansible parison into a molding zone and then expanding the parison to form the hollow article.

9. The method of claim 8 wherein the mononitrile is methacrylonitrile.

10. The method of claim 8 wherein the mononitrile is acrylonitrile.

11. The method of claim 8 wherein the olefinically unsaturated monomer is styrene.

12. The method of claim 8 wherein the resin is a methacrylonitrile-styrene copolymer.

13. The method of claim 8 wherein the resin is a copolymer of acrylonitrile and styrene grafted onto a styrene-butadiene rubber.

14. The method of claim 8 wherein the article is a bottle.

References Cited
UNITED STATES PATENTS 3,066,356  12/1962  Porter _____ 264—211 X
3,567,813  3/1971  Keane et al. _____ 264—102

OTHER REFERENCES

E. G. Fisher: *Extrusion of Plastics*, 1964, pp. 144–147.

JAN H. SILBAUGH, Primary Examiner

U.S. Cl. X.R.

260—29.6 AN; 264—102, 211, 331